(12) United States Patent
Lucas et al.

(10) Patent No.: US 6,918,107 B2
(45) Date of Patent: Jul. 12, 2005

(54) PROGRAMMING LANGUAGE EXTENSIONS FOR PROCESSING DATA REPRESENTATION LANGUAGE OBJECTS AND RELATED APPLICATIONS

(75) Inventors: Terry L. Lucas, Mill Creek, WA (US); Adam Bosworth, Mercer Island, WA (US); John C. Schneider, Bellevue, WA (US); Kenneth Eric Vasilik, Redmond, WA (US)

(73) Assignee: BEA Systems, Inc., San Jose, CA (US)

( * ) Notice: Subject to any disclaimer, the term of this patent is extended or adjusted under 35 U.S.C. 154(b) by 681 days.

(21) Appl. No.: 10/082,800

(22) Filed: Feb. 22, 2002

(65) Prior Publication Data

US 2003/0070158 A1 Apr. 10, 2003

Related U.S. Application Data

(63) Continuation-in-part of application No. 09/898,898, filed on Jul. 2, 2001, now Pat. No. 6,754,884.
(60) Provisional application No. 60/302,892, filed on Jul. 2, 2001.

(51) Int. Cl.$^7$ ................................................. G06F 9/45
(52) U.S. Cl. ...................................... 717/124; 717/114
(58) Field of Search ................................. 717/124, 114

(56) References Cited

U.S. PATENT DOCUMENTS

| | | | | |
|---|---|---|---|---|
| 5,812,768 A | 9/1998 | Page et al. | ..................... | 707/10 |
| 5,970,490 A | 10/1999 | Morgenstern | ................ | 707/10 |
| 6,070,184 A | 5/2000 | Blount et al. | ................ | 709/200 |
| 6,209,018 B1 | 3/2001 | Ben-Shachar et al. | ....... | 709/105 |
| 6,226,675 B1 | 5/2001 | Meltzer et al. | ............. | 709/223 |
| 6,230,160 B1 | 5/2001 | Chan et al. | ................. | 707/103 |
| 6,253,252 B1 | 6/2001 | Schofield | .................... | 709/315 |
| 6,314,429 B1 | 11/2001 | Simser | ....................... | 707/103 |
| 6,404,445 B1 | 6/2002 | Galea et al. | ................ | 345/853 |
| 6,449,620 B1 | 9/2002 | Draper et al. | ............... | 707/103 |
| 6,754,884 B1 * | 6/2004 | Lucas et al. | ................ | 717/108 |
| 6,823,504 B1 * | 11/2004 | Sokolov | ..................... | 717/136 |
| 2001/0029604 A1 | 10/2001 | Dreyband et al. | ............. | 707/2 |
| 2001/0047385 A1 | 11/2001 | Tuatini | ....................... | 370/203 |
| 2001/0047394 A1 * | 11/2001 | Kloba et al. | ................ | 709/217 |
| 2002/0073236 A1 | 6/2002 | Helgeson et al. | ........... | 707/100 |
| 2002/0099738 A1 | 7/2002 | Grant | ......................... | 707/513 |
| 2002/0120719 A1 * | 8/2002 | Lee et al. | ................... | 709/219 |
| 2002/0184264 A1 | 12/2002 | Berg et al. | ................. | 707/201 |
| 2003/0120824 A1 * | 6/2003 | Shattuck et al. | ........... | 709/313 |

OTHER PUBLICATIONS

Ha et al., "Mapping XML Documents to the Object–Relational Form," IEEE, Jun. 12, 2001, pp. 1757–1761.

(Continued)

*Primary Examiner*—John Chavis
(74) *Attorney, Agent, or Firm*—Schwabe, Williamson & Wyatt, P.C.

(57) ABSTRACT

A system is provided for manipulating data representation language based—objects in a native programming language environment. In one embodiment, the system is used to map data objects of the data representation language to corresponding objects within the native programming language and vice versa. In one embodiment, the system is equipped to receive a mapping definition mapping selected elements of a data representation language, such as an XML data structure, to selected objects of a programming language, such as ECMAScript. The system is further equipped to determine whether the mapping definition comprises one or more definitional statements expressed with data representation language oriented language elements of a programming language. Further, the system is equipped to process the mapping definition statements comprising data representation language oriented language elements of the programming language, in accordance with syntactical and semantic definitions of the data representation language oriented language elements.

45 Claims, 18 Drawing Sheets

| FUNCTION | RESULT |
|---|---|
| parent( ) | Returns The Parent Of The Xml Value |
| children( ) | Returns All The Children Of The Xml Value |
| childIndex( ) | Returns The Ordinal Position Of The Xml Value Within Its Parent |
| xpath(*expression*) | Evaluates The Xpath *Expression* Using The Xml Value As The Context Node |
| appendChild(*child*) | Inserts A New *Child* Node After The Existing Children Of The Xml Value |
| prependChild(*child*) | Inserts A New Child Node Before The Existing Children Of The Xml Value |
| copy( ) | Returns A Complete Copy Of The Xml Value |
| delete(*childList*) | Deletes The Children Referenced By *Childlist* |
| InnerXML(*content*) | Replaces The Entire Contents Of The Xml Value With New *Content* |
| validate( ) | Validates the XML value conforms with it's associated schema type. If not, it returns errors. |

OTHER PUBLICATIONS

Suzuki et al., "Managing the Software Design documents with XML," ACM, 1998, pp. 127–136.

Banbara et al., "Translating A Linear Logic Programming Language into Java," Electronic Notes in Theoretical Computer Science (1999), pp. 1–15.

Binding et al., "Generation of Java Beans to Access XML Data," Proceedings of the first International Conference on Web Information Systems Engineering, Jun. 2000, vol. 2, pp. 143–149.

Chandramouli, R., "Application of XML Tools for Enterprise–Wide RBAC Implementation Tasks," Proceedings of the 5$^{th}$ ACM Workshop on Role–based Access Control, Jul. 2000, pp. 11–18.

Imamura et al., "Mapping Between ASN.1 and XML," Jan. 2001, Proceedings of the 2001 Symposium on Applications and the Internet, pp. 57–64.

Rundensteiner et al., "Maintaining Data Warehouses Over Changing Information Sources," Communications of the ACM, Jun. 2000, vol. 43, No. 6, pp. 57–62.

Sahuguet et al., "Looking at the Web Through XML Glasses," Proceedings of the 1999 IFCIS International Conference on Cooperative Information Systems, Sep. 1999, pp. 148–159.

Wallace et al., "Haskell and XML: Generic Combinators or Type–Based Translation?" (1999) ACM, pp. 148–159.

Zwol et al., "The Webspace Method: On The Integration of Database Technology with Multimedia Retrieval," Proceedings of the 9$^{th}$ International Conference on Information and Knowledge Management, Nov. 2000, pp. 438–445.

* cited by examiner 300 (A) XML x;      // an XML variable
    (B) XML y;      // another XML variable
    (C) int i;      // an integer variable
    (D) float f;    // a floating point variable 310 (A) XML p = <person><name>John</name><age>25</age></person>;
    (B) e = <employees>
    (C)       <employee id="1"><name>Joe</name><age>20</age></employee>
    (D)       <employee id="2"><name>Sue</name><age>30</age></employee>
    (E)     </employees>;

320 (A) for (i = 0; i < 10; i++)
    (B)   e[i] = <employee id={i}>              // compute id value
    (C)            <name>{names[i].toUpperCase()}</name>   // compute name value
    (D)            <age>{ages[i]}</age>         // compute age value
    (E)          </employee>;

330
(A) XML John = "<employee><name>John</name><age>25</age></employee>";
(B) XML Sue="<employee><name>Sue</name><age>32</age></employee>";
(C) String tagName = "employees";
(D) XML employees = "<"+ tagName +">" + John + Sue + "</"+ tagName +">";
(E) XML employees = <employees>{John + Sue}</employees>;

340
(A) XML e = <employee id="1"><name>John</name><age>25</age></employee>;
(B) String name = e.employee.name;    // get the name of the employee
(C) e.employee.name = "Fred";    // set the name of the employee
(D) XML ref = e.employee;    // returns a reference to the <employee> element 350
(A) int empid = e.employees.employee[1].@id;    // get the id attribute of the second employee
(B) e.employees.employee[3].@id = 10;    // set the id attribute of the fourth employee 355
(A) e = <employees>
        <employee id="4" bossid="2"><name>Jim</name><age>25</age></employee>
        <employee id="3" bossid="2"><name>Joe</name><age>20</age></employee>
        <employee id="2" bossid="1"><name>Sue</name><age>30</age></employee>
        <employee id="1"><name>Mr. CEO</name><age>35</age></employee>
    </employees>;
(B) bossids = e.employee.@bossid    // get all the boss ids (2, 2, 1)
(C) bosses = e.employee.@bossid.name    // get names of all bosses (Sue, Sue, Mr. CEO)
(D) bossages = e.employee.@bossid.age    // get ages of all bosses (30, 30, 35)

360 (A) e = <employees>
    (B)     <employee id="1"><name>Joe</name><age>20</age></employee>
    (C)     <employee id="2"><name>Sue</name><age>30</age></employee>
    (D) </employees>;
    (E) names = e..name;          // get all the names in e 370 (A) e = <employees>
    (B)     <employee id="0"><name>Joe</name><age>20</age></employee>
    (C)     <employee id="1"><name>Sue</name><age>30</age></employee>
    (D) </employees>;
    (E) suesAge = e.employees.employee[1].age;        // get Sue's age
    (F) e.employees.employee[1].name = "Fred";        // Change Sue's name to Fred 380 (A) For (n in e..name)
    (B)     Print ("Employee name: " + n);            // print out all the names in e
    (C) For (i = 0; i < e..name.length; i++)
    (D)     print("Employee name:" + e..name[i]);

FIG. 3C 385
(A) John = e..employee.(name=="John");  //employees with name John
(B) emp=e..employee.(@id==1).name;  //name of employee with id 1
(C) twoEmployees=e..employee.(@id==0 || @id==1);  //employees with id's 0 and 1

(D)
```
i=0;
twoEmployees = new Array(2);
for (p in e..employee){
    if (p.@id==0 || p.@id==1){
        twoEmployees[i++]=p;
    }
}
```

390
(A)
```
e = <employees>
       <employee id="0" ><name>Jim</name><age>25</age></employee>
       <employee id="1" ><name>Joe</name><age>20</age></employee>
       <employee id="2" ><name>Sue</name><age>30</age></employee>
       <employee id="3"><name>Mr. CEO</name><age>35</age></employee>
    </employees>;
```

(B) // replace Joe with Bill using a document fragment
e..employee[1] = <><name>Bill</name><age>25</age><hobby>Skiing</hobby></>;

(C) // replace Jim with Ann without using document fragments
e.employee[0].name = "Ann";
e.employee[0].age = 32;
e.employee[0].appendChild("hobby");
e.employee[0].hobby = "Kayaking";

FIG. 3D

```
// Xpath function to retrieve an employee with a particular name from an employee list
language(XPATH) function employeeByName(e, name) {
    $e/employees/employee[name = $name]
}

// XML function to build an employee record given a name and age
language (XML) function createEmployee(name, age)
{
    <employee><name>{$name}</name><age>{$age}</age></employee>
}

// XQUERY function to get the name and average book price from a list of books
// given as a parameter. Each book contains a publisher and price.
language (XQUERY) function publisherInfo(booklist)
{
    for $p in distinct(document($booklist)/publisher)
    let $a := avg($booklist/book[publisher = $p]/price)
    return
        <publisher>
            <name>{$p/text()}</name>
            <aveprice>{$a}</aveprice>
        </publisher>
}

// SQL function to get the employee with a given ID
language(SQL) function employeeByID(id)
{
    select * from e.employees.employee where id == $id;
}
```

FIG. 3E

| FUNCTION | RESULT |
|---|---|
| parent( ) | Returns The Parent Of The Xml Value |
| children( ) | Returns All The Children Of The Xml Value |
| childIndex( ) | Returns The Ordinal Position Of The Xml Value Within Its Parent |
| xpath(*expression*) | Evaluates The Xpath *Expression* Using The Xml Value As The Context Node |
| appendChild(*child*) | Inserts A New *Child* Node After The Existing Children Of The Xml Value |
| prependChild(*child*) | Inserts A New Child Node Before The Existing Children Of The Xml Value |
| copy( ) | Returns A Complete Copy Of The Xml Value |
| delete(*childList*) | Deletes The Children Referenced By *Childlist* |
| innerXML(*content*) | Replaces The Entire Contents Of The Xml Value With New *Content* |
| validate( ) | Validates the XML value conforms with it's associated schema type. If not, it returns errors. |

FIG. 3F

```
Function FromXML(XML availableat, Point[] points) { int i = 0;
  points = new Point[availableat..address.length()];    // one point for each address // for each address, compute the display label and point location
  for (a in availableat..address) { points[i].label = a.parent().name + '\n'        // The label is 3 lines long
                                                    // line 1: store name
        + a.street + '\n'                           // line 2: street address
        + a.city + ', ' + a.state + ', ' + a.zip;   // line 3: city, state, zip // compute map location from the address
    points[i].location = new LatitudeLongitude(a.street, a.city, a.state, a.zip);
    i++;
  }
}
```

```
Function ToXML(Point[] points, XML availableat) {

// build the root node
525 availableat = <available-at></available-at>;

// for each point, add a store element
530 for (p in points) {
        lines = p.label.split("\n");              // split the label up into its 3 lines
        citystatezip = lines[2].split(", ");      // split line 3 into city, state, zip // append a store element representing this point
535 availableat.available-at.appendChild(
            <store>
                <name>{lines[0]}</name>            // line 1 is store name
                <address>
                    <street>{lines[1]}</street>    // line 2 is street addr
                    <city>{citystatezip[0]}</city>
                    <state>{citystatezip[1]}</state>
                    <zip>{citystatezip[2]}</zip>
                </address>
            </store>);
    }
}
```

FIG. 5B

```
import org.w3c.dom.*;
import org.apache.xerces.dom.*;

// class declarations omitted ...

public static void FromXML(Document availableat, Point[] points) {
    // one point for each address
    NodeList addresses = availableat.getElementsByTagName("address");
    points = new Point[addresses.getLength()];

// for each address, compute the display label and point location
    for (int i = 0; i < addresses.getLength(); i++) {
        // get the store name, street address, city, state and zip for each address
        Element a = (Element)addresses.item(i);
        Element store = (Element)a.getParentNode();
        Node name = store.getElementsByTagName("name").item(0);
        Node street = a.getElementsByTagName("street").item(0);
        Node city = a.getElementsByTagName("city").item(0);
        Node state = a.getElementsByTagName("state").item(0);
        Node zip = a.getElementsByTagName("zip").item(0);

// the label is three lines long
        points[i].label = name.getNodeValue() + '\n'      //line 1: store name
                + street.getNodeValue() + '\n'            //line 2: street address
                + city.getNodeValue() + ", "              //line 3: city
                + state.getNodeValue() + ", "             //        state
                + zip.getNodeValue();                     //        zip // compute map location from the address
        points[i].location = new LatitudeLongitude(
                    street.getNodeValue(), city.getNodeValue(),
                    state.getNodeValue(), zip.getNodeValue());
    }
}
```

FIG. 7A
(PRIOR ART)

```
public static void ToXML(Point[] points, Document availableat) {
    // build the root node
    availableat = new DocumentImpl();
    Element root = availableat.createElement("available-at");

// for each point, add a store element
    for (int i = 0; i < points.length; i++) {
        // split the label up into its 3 lines
        String name = points[i].label.substring(0,
                points[i].label.indexOf('\n'));
        String street = points[i].label.substring(name.length()+1,
                points[i].label.indexOf('\n', name.length()+1));
        String citystatezip = points[i].label.substring(
                name.length()+street.length()+2);

// split line 3 into city, state and zip
        String city = citystatezip.substring(0,
                citystatezip.indexOf(", "));
        String state = citystatezip.substring(city.length()+2,
                citystatezip.indexOf(", ", city.length()+2));
        String zip = citystatezip.substring(
                city.length()+state.length()+4);

// create Text Nodes for the store name, street addres, city, state and zip
        Text nameText = availableat.createTextNode(name);
        Text streetText = availableat.createTextNode(street);
        Text cityText = availableat.createTextNode(city);
        Text stateText = availableat.createTextNode(state);
        Text zipText = availableat.createTextNode(zip);

// create elements to hold the text nodes
        Element ename = availableat.createElement("name");
        Element eaddress = availableat.createElement("address");
        Element estreet = availableat.createElement("street");
        Element ecity = availableat.createElement("city");
        Element estate = availableat.createElement("state");
        Element ezip = availableat.createElement("zip");

// attach the text nodes to their associated elements
        ename.appendChild(nameText);
        estreet.appendChild(streetText);
        ecity.appendChild(cityText);
        estate.appendChild(stateText);
        ezip.appendChild(zipText);
```

FIG. 7B
(PRIOR ART)

```
            // build the address element content
            eaddress.appendChild(estreet);
            eaddress.appendChild(ecity);
            eaddress.appendChild(estate);
            eaddress.appendChild(ezip);

// create the store element, add it's associated name and address
            Element store = availableat.createElement("store");
            store.appendChild(ename);
            store.appendChild(eaddress);

// append a store element representing this point
            root.appendChild(store);
        }
}
```

FIG. 7C
(PRIOR ART)

```
// Use the AvailableAt Schema to enforce the rules established by product manufacturers
810  import AvailableAt.xsd;

820  Function FromXML(AvailableAt availableat, Point[] points) {
        int i = 0;
        points = new Point[availableat..address.length()];    // one point for each address // for stores that stock the product, compute the label and point from the address
830     for (a in availableat..store.(stock-item == "yes").address) {

// The label is 3 lines long
            points[i].label = a.parent().name + '\n'        // line 1: store name
                + a.street + '\n'                            // line 2: street address
                + a.city + ', ' + a.state + ', ' + a.zip;   // line 3: city, state, zip // compute map location from the address
            points[i].location = new LatitudeLongitude(a.street, a.city, a.state, a.zip);
            i++;
        }
    }
```

FIG. 8A

840 Function ToXML(Point[] points, AvailableAt availableat) {
    // build the root node
    availableat = <available-at></available-at>;

// for each point, add a store element
    for (p in points) {
        lines = p.label.split("\n");          // split the label up into its 3 lines
        citystatezip = lines[2].split(", ");  // split line 3 into city, state, zip // append a store element representing this point
        availableat.available-at.appendChild(
            <store>
                <name>{lines[0]}</name>              // line 1 is store name
                <stock-item>yes</stock-item>
                <address>
                    <street>{lines[1]}</street>      // line 2 is street addr
                    <city>{citystatezip[0]}</city>
                    <state>{citystatezip[1]}</state>
                    <zip>{citystatezip[2]}</zip>
                </address>
            </store>);
    }

850 // If resulting XML does not conform to the Schema, generate an error
    errors = availableat.validate();
    if (errors != null)
        throw InvalidXMLException(errors);

FIG. 8B

```
// Use the AvailableAt Schema to enforce the rules established by product manufacturers
import AvailableAt.xsd;
```

910  `language(XQUERY) Function getStates(AvailableAt availableat){`

920
```
<states>
    FOR $state In distinct($availableat//state)
    LET $numStores := count($availableat//address[state = $state])
    RETURN <state>
               <abbreviation> $state </abbreviation>
               <stores> $numStores </stores>
           </state>
</states>
}
```

930  `Function FromXML(AvailableAt availableat, Point[] points) {`

```
    // get the states that carry the product and # stores in each state
    XML states = getStates(availableat);
    int i = 0;
    points = new Point[states..state.length()];        // one point for each state
    // for each state, compute the appropriate label and point
```

940
```
    for (s in states..state) {
        // The label contains the state abbreviation and # stores
        points[i].label = s.abbreviation + '\n' + s.stores;
        // compute map location from the state
        points[i].location = new LatitudeLongitude(s.state);
        i++;
    }
}
```

FIG. 9

PROGRAMMING LANGUAGE EXTENSIONS FOR PROCESSING DATA REPRESENTATION LANGUAGE OBJECTS AND RELATED APPLICATIONS

RELATED APPLICATIONS

This patent application is a continuation-in-part of non-provisional application Ser. No. 09/898,898 filed on Jul. 02, 2001, now U.S. Pat. No. 6,754,884, and claims priority to provisional application No. 60/302,892 also filed on Jul. 2, 2001.

BACKGROUND OF THE INVENTION

1. Field of the Invention

The present invention relates to the field of programming languages. More specifically, the present invention relates to a method for manipulating data representation language based objects in a native programming language environment.

2. Background Information

XML is rapidly emerging as the de-facto standard for transmitting data structures between software applications and web services. While most software applications and web services are written in modern programming languages, such as Java or C++, none of these programming languages provide native support for representing and manipulating XML. Consequently, programmers are forced to develop or adopt external software packages for representing and manipulating XML within the context of their applications and web services.

In general, external software packages are not capable of providing the host language with native support for processing XML data. As such, they represent and manipulate XML in ways that are quite different than those provided by the host language for its native data types. Most often, external software packages represent XML data using a general purpose tree abstraction and provide a tree-based application programming interface (API) for navigating and manipulating the data (e.g., getParentNode( ), getChildNodes( ), removeChild( ), etc.). This method of accessing and manipulating data structures is cumbersome and time consuming compared to methods used for accessing and manipulating data structures native to the host programming language.

Therefore, a programming language that enables the manipulation of data representation language data structures such as XML with the same power and flexibility afforded native data structures is desirable.

BRIEF DESCRIPTION OF DRAWINGS

The present invention will be described by way of exemplary embodiments, but not limitations, illustrated in the accompanying drawings in which like references denote similar elements, and in which:

FIGS. 3A–3F illustrate various language extensions in accordance with one embodiment of the present invention;

FIGS. 5A–5B illustrate example functions incorporating language extensions of the present invention for mapping XML documents to ECMAScript objects and ECMAScript objects to XML documents, in accordance with one embodiment;

FIGS. 7A–C illustrate example functions based upon the prior art, for mapping XML documents to Java objects and Java objects to XML documents;

FIGS. 8A–B include versions of ECMAScript functions originally illustrated in FIGS. 5A–5B, which have been modified in accordance with the teachings of the present invention; and FIG. 9 illustrates the use of functions written in accordance with one embodiment of the invention.

DETAILED DESCRIPTION OF THE INVENTION

Figure 1:
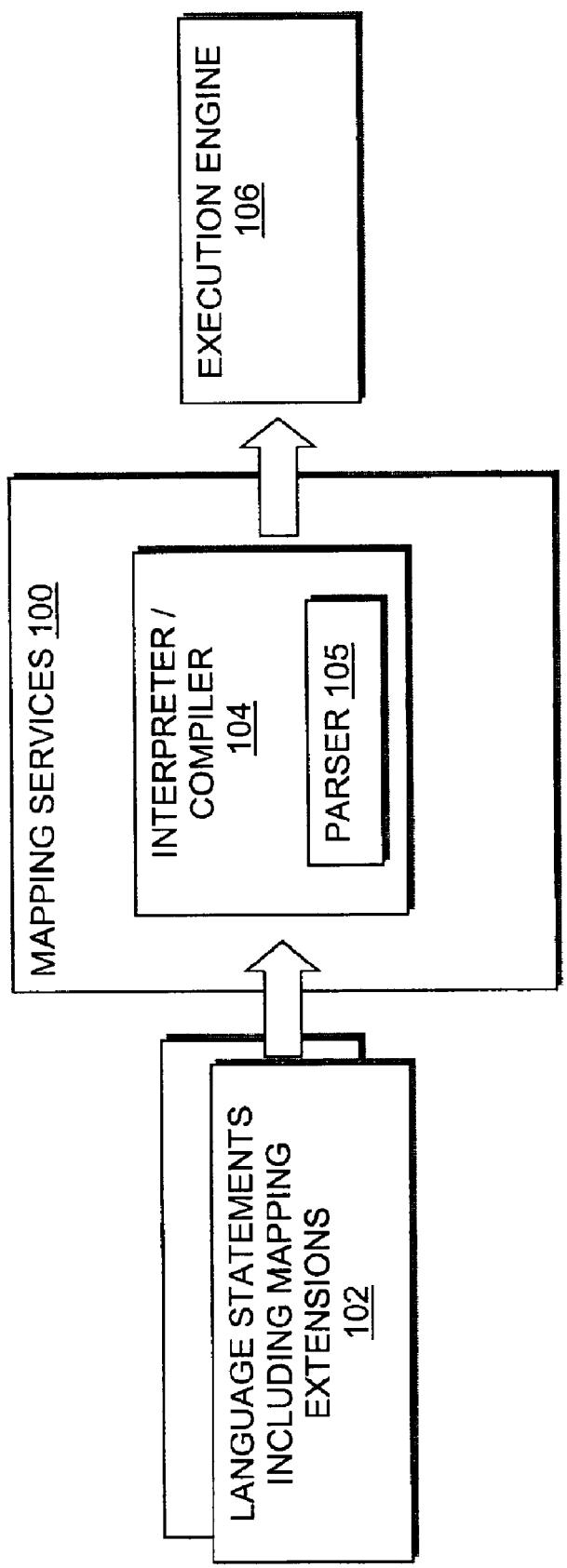
FIG. 1 illustrates an overview of one embodiment of the present invention.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Concepts and terminology commonly used by those familiar with compiler and parser design are used herein. Those who are unfamiliar with the inner workings of compilers and parsers are referred to "Compilers: Principals, Techniques and Tools" by A. Aho, R. Sethi and J. Ullman published by Addison Wesley Publishing Company in November 1985 (ISBN 0201100886). In addition, basic familiarity by the reader with XML concepts and terminology, including XML, XML Schema, the Document Object Model (DOM), the XML Query Language and XPath is assumed. Those unfamiliar with these technologies are referred to the following World Wide Web Consortium (W3C) publications: Extensible Markup Language (XML) 1.0 (Second Edition), W3C Recommendation REC-XML-20001006, 6, Oct. 2000; Document Object Model (DOM) Level 1 Specification, W3C Recommendation REC-DOM-Level-1-19981001, 1, Oct. 1998; XQuery 1.0: An XML Query Language, W3C Working Draft WD-XQUERY-20021220 20, Dec. 2001; XML Path Language (XPath), W3C Recommendation REC-XPATH-19991116, 16, Nov. 1999; XML Schema Part 0: Primer, W3C Recommendation REC-XMLSCHEMA-0-20010502, 2, May 2001; XML Schema Part 1: Structures, W3C Recommendation REC-XMLSCHEMA-1-20010502, 2, May 2001; and XML Schema Part 2: Datatypes, W3C Recommendation REC-XMLSCHEMA-2-20010502 2, May 2001.

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

The present invention includes the provision of functional descriptions in the form of programming language extensions to facilitate flexible manipulation of data representation language structures such as XML objects in a native programming environment. The language extensions include a native XML data type and a collection of operations that enable programmers to navigate and manipulate XML objects in much the same way native language objects are navigated and manipulated. Accordingly, the present invention provides a mechanism for manipulating both XML and native language objects, that is particularly well suited for the increasingly ubiquitous problem of mapping XML objects into and out of software applications and web services written in modern programming languages.

FIG. 1 illustrates an overview of the present invention, in accordance with one embodiment. As shown, mapping services 100 include interpreter/compiler 104 ("interpreter"), which further contains parser 105. In one embodiment, programming statements 102 including various language extensions of the present invention are provided to mapping services 100 to be interpreted/compiled by interpreter/compiler 104. Parser 105 of mapping services 100 parses programming statements 102 according to any of a variety of parsing techniques known in the art. Once the statements are parsed, interpreter/compiler 104 compiles the statements into executable code, which is then provided to execution engine 106. Execution engine 106 controls execution of the code (by e.g. a processor) and performs conventional execution runtime services, such as memory allocation request and release, error/exception handling, and so forth.

For the illustrated embodiment, interpreter/compiler 104 includes an application programming interface (API) (not shown), through which programming statements formed using language extensions of the present invention may be programmatically submitted for compilation by a variety of application-specific processes. For example, in accordance with one embodiment of the present invention, a web server application makes calls to mapping services 100 upon the receipt of XML documents in order to map XML document objects as e.g., internal Java classes for additional processing by the web server. Such application-specific processes may be co-resident with mapping services 100 on the same "host" system (not shown) as mapping services 100, or located remote from the "host" system and communicate with mapping services 100 using conventional cross system communication techniques.

Figure 2:
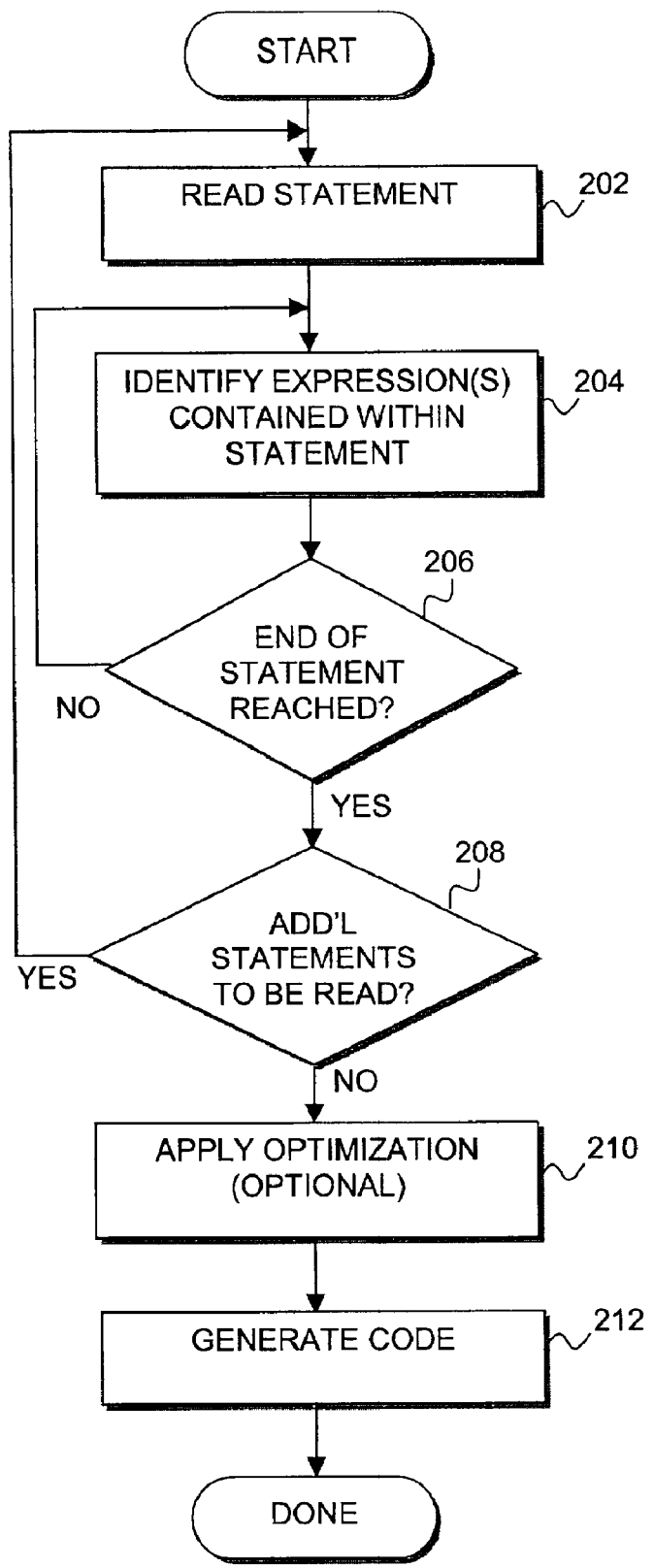
FIG. 2 illustrates an exemplary operational flow of interpreter/compiler 104, in accordance with one embodiment of the invention.

FIG. 2 illustrates an exemplary operational flow of interpreter/compiler 104 in accordance with one embodiment of the invention. In operation, interpreter/compiler 104 reads one of the programming statements 102, including one or more language extensions of the present invention, block 202. Using any one of a number of parsing techniques known in the art, parser 105 then parses the statement read to identify one or more expressions and/or sub-expressions contained therein based upon a language dictionary or grammar maintained by interpreter/compiler 104, blocks 204 & 206. Parser 105 may build a symbol table as it reads and parses symbols declared in programming statements 102, which is used in determining a semantic for other programming statements containing those symbols. Interpreter/compiler 104 continues to read statements and evaluate expressions until all statements have been read and parsed, block 208. Moreover, interpreter 104 may optionally apply one or more optimizations to the expressions analyzed, block 210. The optimizations may be any one or more of the applicable compiler optimization techniques known in the art. Finally, with or without optimizing the commands analyzed, at block 212, interpreter/compiler 104 generates executable code for the expressions analyzed. In one embodiment, interpreter/compiler 104 generates byte codes for the expressions analyzed. In alternate embodiments, other equivalent "code generation" approaches may be practiced instead.

Language Extensions

As described above, conventional programming languages do not provide sufficient functionality when it comes to interoperability and translation between XML documents and programming language objects. Therefore, in accordance with the teachings of the present invention, XML-oriented language extensions for use in association with a programming language, such as Java, C++, ECMAScript, and so forth, are provided and will now be described. To avoid confusion, the following language extensions are described in relation to ECMAScript, however, the applicability of the present invention should not be read as being limited solely to ECMAScript.

FIGS. 3A–3E illustrate various ECMAScript language extensions, in accordance with one embodiment of the present invention. Referring first to FIG. 3A, where language extension 300 illustrates two XML (data) type declarations explicitly indicating that a given variable (e.g. x,y) is associated with an XML class of variables. These XML variables may be declared just as any native ECMAScript data type may be declared as is illustrated in lines 300(C) and (D). In one embodiment, an ECMAScript-aware parser (e.g. parser 105) is equipped to recognize XML data type declarations and associate them with the appropriate items in the corresponding symbol table (e.g., variables, function parameters, function return values, etc.). Interpreter/compiler 104 uses this type of information to determine the semantics of operations performed on values of type XML, and for example, to decide when to implicitly coerce values to or from the XML type (described more fully below). In the illustrated embodiment, the XML type is explicitly declared by way of a self-identifying prefix (e.g., 'XML'). In one embodiment, interpreter/compiler 104 can use the DOM as the underlying data structure for storing and manipulating values of type XML, though this implementation detail need not be evident to the user.

Language extension 310 illustrates an assignment made between a structured expression including XML syntax and an XML-typed variable. For example, in line 310(A) an XML-typed variable "p" is assigned an XML structure representing a person element including both name and age elements (e.g. 'John' and '25', respectively). Although the expression in line 310(A) includes an explicit XML-type indicator (as described above), variables initialized using expressions containing XML syntax do not require such explicit XML-type declarations when used in loosely typed languages. In one embodiment, the "<" symbol, which is used in all XML tag definitions, is further utilized in the present invention as a unary operator to indicate to the interpreter/compiler that the expression to follow is to be treated as a string and parsed as an XML expression. In one embodiment, the operand of the "<" operator is the entire XML literal up to and including the matching end tag. Accordingly, since the unary operator "<" triggers a result in a value of type XML, it is not necessary for variables of loosely typed languages being assigned XML literals to be explicitly declared as type XML. For example, lines 310(B) –(E) illustrate an XML-type variable "e" that has been implicitly declared as type XML based upon the content of the expression.

Language extension 320 illustrates that, in accordance with the teachings of the present invention, portions of an XML literal can be determined dynamically through the use of embedded expressions. In the illustrated embodiment, the mapping services of the present invention dynamically resolve portions of XML literals containing embedded ECMAScript expressions. In one embodiment, interpreter/compiler 104 is equipped to recognize a set of curly braces (e.g., "{. . . }") as an embedded expression operator having higher precedence than the unary operator "<" (described above). However, it should be noted that operators other than "{ }" may be utilized as an embedded expression operator without departing from the spirit and scope of the invention. In any event, if parser 105 identifies that the embedded expression operator is present within an expression, the operand indicated by the embedded expression operator is passed to interpreter/compiler 104 for evaluation, with the resulting return value being coerced (described below) to a string. Thereafter, string concatenation is used to insert the return value between the XML literals preceding and following the embedded expression. Once all the embedded expressions have been evaluated and their results inserted within the XML literal, the presence of the unary operator "<" causes interpreter/compiler 104 to convert the resulting string to an XML type.

Language extension 330 of FIG. 3B illustrates the principle of type coercion practiced by interpreter/compiler 104. In accordance with one embodiment of the invention, any value of type string that occurs where parser 105 expects a value of type XML is automatically converted to the XML data type by parsing the contents of the string as XML data. Prior to the conversion, the string value can be constructed and manipulated using string arithmetic without regard for XML constraints such as well-formedness. For example, in line 330(D), an XML type variable "employees" is assigned the result of multiple string concatenations. More specifically, the variable "tagName" of type string is concatenated with two other string values (e.g., "<" and ">") to form XML open and close tags. The resulting tags are again treated as strings and concatenated with the values of variables John and Sue, which are also treated as strings notwithstanding the fact that they represent XML expressions (e.g. as illustrated in lines 300(A) and (B)). The string value resulting from the concatenations is then coerced back into an XML value due to the explicit "XML" data type declaration.

Additionally, string values are also automatically coerced into XML values in other contexts where XML is expected. For example, string values passed to functions expecting XML parameters and string values embedded within XML literals will similarly be converted into XML. Accordingly, line 330(E) yields the same result as line 330(D). As with other type coercions, interpreter/compiler 104 uses the symbol table to determine whether the 'type' of a particular value matches that of it's target variable, function parameter, etc. When a string value is provided where an XML value is expected, the compiler employs an XML parser to perform the conversion. When an XML value is expected and the value provided is neither XML nor a string, the compiler attempts to convert the value to a string (e.g., with Java's Object.toString( ) method), then parses the resulting string as XML.

Language extension 340 illustrates how child elements may be accessed and/or assigned in accordance with one embodiment of the present invention. As shown in the illustrated embodiment, once a variable contains an XML value, the child elements of the XML variable may be accessed and/or assigned using a predefined operator such as a period/dot (".") (hereinafter "dot operator"). The dot operator examines all of the child elements of its left operand and returns in order, those elements with names that match the right operand. This may result in zero or more elements being returned. In one embodiment, if the designated child element is a leaf node (i.e. does not contain any child elements itself), then the content of that child element is returned. However, if the designated child element is not a leaf node, then the designated child element complete with all of its descendants is returned (see e.g. 340(D)). Additionally, it is possible for the left operand of a dot operator to be a list of elements instead of a single element (e.g., consider when two or more dots are used in succession). In this case, the dot operator iterates over the list examining the children of each element in order. This treatment intentionally blurs the distinction between a single element and lists of elements to simplify the programmer's task.

Language extension 350, illustrates that attributes of an XML element may be accessed and assigned using an "attribute" operator. The attribute operator examines all of the attributes of its left operand and returns the value of the one whose name matches its right operand. In one embodiment, the attribute operator is represented by the '.@' symbol. For example, in line 350(A), the value associated with the 'id' attribute for one of at least two employees is retrieved and assigned to an 'empid' variable of type integer, while in line 350(B), the 'id' attribute of the fourth employee is set to '10'.

In accordance with one embodiment of the invention, elements referenced by IDREF or IDREFS attributes (e.g., indicated by an appropriate declaration in an XML Schema or Document Type Declaration (DTD)) are made accessible as if they were immediate child elements of the attribute. For example, given the structure illustrated in line 355(A), the expression shown in line 355(B) would cause all boss id's to be returned, while the expression shown in line 355(C) would cause the names of all the bosses to be returned, and the expression shown in line 355(D) would cause the ages of all the bosses to be returned. In one embodiment, if the left operand of the dot operator (i.e. ".") is an IDREF or IDREFS attribute, the dot operator will retrieve the value(s) of the left operand, search the document for elements containing an ID attribute (e.g., indicated by an appropriate declaration in an XML Schema or DTD) whose value is equivalent to one of the values of the left operand, and return a list of zero or more matching elements. In one embodiment, interpreter/compiler 104 may maintain an efficient mapping associating each ID value in the document with the node it identifies to avoid repeatedly searching the document for ID attributes with matching values.

In addition to providing direct access to the immediate child elements of an XML value, the language extensions of the present invention provide direct access to all descendents (i.e., children, grandchildren, great grandchildren, etc.) of an XML value (see e.g., language extension 360 of FIG. 3C). In one embodiment the "double dot" (e.g. '..') operator examines all of the descendent elements of its left operand and returns those with names that match its right operand in document order. When the left operand is a list of elements, the ".." operator iterates over the list examining the descendents of each element in order. For example, the expression of line 360(E) will cause the employee names (e.g. 'Joe' and 'Sue') defined in lines 360(A)–(D) to be returned.

Language extension 370 illustrates an indexing property of the present invention, whereby given a list of child elements, a predefined indexing operator can be utilized to identify an individual child element within the list. In one embodiment, this is accomplished by extending interpreter/compiler 104 to provide automatic type coercion between the host language's array type and XML NodeLists. In one embodiment, a set of square brackets "[ ]" is used as the indexing operator. The indexing operator essentially selects a single element from its left operand based on its ordinal position within the list (i.e. as indicated by the indexing operator). The left operand may represent a list of elements, or a single element. In the event the operand represents a single element, it will be treated as a list having a size equal to one.

The present invention also provides for iterating over lists of child elements as illustrated e.g. by language extension 380. In one embodiment, iterating over lists of child elements is accomplished using the native methods used to iterate over arrays in the host programming language. For example, as illustrated in lines 380(A)–(B), the expression "e..name" returns a list of elements, and the "for" statement steps through the list in order. For each element in the list, the "for" statement assigns the variable "n" to the element and proceeds to print the element preceded by the text "Employee name:". Alternatively, the length of a list of child elements may be determined using the methods available in the host programming language to determine the length of an array. For example, in the statement on line 380(C)), the length of the list of child elements is determined by accessing the implicit "length" property (e.g., ".length") used by the host ECMAScript language for determining the length of arrays. Accordingly, lines 380(C)–(D) produce the same result as produced by lines 380(A)–(B).

Language extension 385 of FIG. 3D illustrates filtering with predicates, in accordance with one embodiment of the invention. When selecting a collection of elements, it is possible to filter the resulting collection such that only elements for which the provided filtering predicate are determined to be true will be returned. In one embodiment, filter predicates are enclosed within parentheses following a "." (i.e. dot) operator. For example, the expression illustrated in line 385(A) of FIG. 3D, returns employee elements having the name "John", whereas line 385(B) returns the name associated with the employee element having an ID equal to "1". Line 385(C) illustrates the use of a predicate composed of a Boolean operator with two sub-expressions. In the illustrated example, employee elements with an ID equal to a first value (e.g. "0") OR a second value (e.g. "1") are returned. In practice, other Boolean operators such as AND, and NOT can also be used. Likewise, although the illustrated filtering predicates test only for equivalence, in accordance with one embodiment, all standard comparison operators such as "<", "≦", ">", "≧", and "!" can be used in filtering a collection of elements. For example, the expression "emp=e..employee.(@id<2).name" could be used to return employee elements having an ID value less than 2. In one embodiment, a predicate can contain any expression that produces a Boolean value when evaluated in the context of the left operand of the filtering predicate.

In one embodiment of the present invention, interpreter/compiler 104 is equipped to recognize a dot operator followed by a set of parentheses (e.g., ".( )") as a filtering predicate operator, indicating that a filtering predicate is to be employed. When recognized, the filtering predicate operator returns a list of zero or more elements from the left operand for which the test condition stipulated inside the parentheses is true. The filtering predicate operator iterates through the list of elements in its left operand and applies the test located inside the parentheses to each element. If the test succeeds (i.e. returns a value of true), the element is added to the list of elements returned. It should be noted that lines 385(C) and 385(D) are semantically equivalent.

Language extension 390 illustrates a further aspect of the present invention whereby anonymous elements can be used to represent document fragments. In accordance with the illustrated embodiment, document fragments are represented as a collection of elements embedded in an unnamed or anonymous parent element. This notation is convenient in cases such as when the developer wishes to replace the entire contents of an element (e.g. child elements of the subject parent element) in one operation rather than performing several independent operations. For example, line 390(B) illustrates how the contents of one element (i.e. the content of employee[1] and all child elements) can be replaced using a single document fragment. More specifically, by using the anonymous element concept of the present invention, the lines of code indicated by 390(C) may beneficially be replaced by the single line of code indicated by line 390(B). In one embodiment of the present invention, interpreter/compiler 104 is equipped to allow the outermost parent element of an XML literal to remain unnamed (which would otherwise not be syntactically allowed). The interpreter/compiler creates an XML document fragment to represent the contents of the unnamed element. Operations between anonymous elements and named elements affect only the children of the named elements, not the elements themselves. For example, the expression in line 390(B) replaces all of the children of the second employee element, but does not change the name or attributes of the employee element itself.

The language extensions of the present invention further include a mechanism for writing reusable functions in programming languages other than the host programming language when those languages are deemed to be better suited than the host programming language for performing a particular task. In one embodiment, an API is defined to extend the host programming language with parsers and expression evaluators for one or more other languages. In one embodiment, the API includes a language lookup table to associate language keywords with a specific external parser and expression evaluator for the respective language, a standard set of objects for passing the name and body of a function to a language parser, and a standard set of objects for passing the function name and parameters into the expression evaluator and returning the result of the expression from the expression evaluator.

In one embodiment of the invention, as shown e.g. in FIG. 3E, a "language" token is introduced into the host programming language to facilitate use of reusable functions in programming languages other than the host programming language. Each time a parser, such as e.g. parser 105, encounters a function declaration preceded by the "language" token, the parser annotates the function's entry in the host language's symbol table with an appropriate language keyword (e.g., XPATH, XQUERY, etc.), finds the appropriate language parser using the language lookup table, and invokes the parser while passing the name and body of the function as parameters. This allows the parser to generate an efficient parsed representation of the function and store it under the associated function name. Thereafter, each time the host programming language expression evaluator encounters a function invocation, the parser determines the correct language by looking in the annotated symbol table, finding the appropriate expression evaluator by using the language lookup table, and invoking the expression evaluator using the API described above to provide the function name and parameters.

The language extensions of the present invention also define a mechanism for creating and enforcing restricted sub-types of the XML data type using a data type description language, such as XML Schema. In one embodiment, this is accomplished using the host programming language's construct for importing external data types. For example, in ECMAScript or Java, this is accomplished using the "import" statement. In this example, an external XML Schema file is used to describe a class of XML objects in the same way an external Java class file is used to describe a class of Java objects. Importing an XML Schema file creates a collection of new data types for manipulating XML values conforming to the constraints defined in the Schema file. Each of these types is a restricted form of the general XML type with the XML Schema file defining the nature and extent of these restrictions. Interpreter/compiler 104 enforces these restrictions through a combination of compile-time and run-time checks for each operation.

For example, a "car.xsd" file may contain an XML Schema describing XML documents with the following structure:

```
<car vin=" . . . ">
    <make> . . . </make>
    <model> . . . </model>
    <color> . . . </color>
    <engine>
        <size> . . . </size>
        <cylinders> . . . </cylinders>
    </engine>
</car>
```

This Schema could be imported to create a new XML datatype called "car" using the "import car.xsd" statement, while the statement "car mycar" might create a new variable called "mycar" of type "car" including mandatory elements and default values specified by the "car.xsd" file. Thereafter, the newly created "mycar" variable may be manipulated and assigned values using native programming language constructs and the XML operators described by the current invention. For example, the following statements could all be used to assign values to the various members of the "mycar" variable:

```
mycar.car.@vin = "123456";
mycar.car.make = "Ford";
mycar.car.model = "Mustang";
```

-continued

```
mycar.car.color = "Red";
mycar.car.engine.size = 2.2;
mycar.car.engine.cylinders = 6;
```

In one embodiment, interpreter/compiler 104 (including parser 105) is augmented with calls to validation algorithms for each type of Schema constraint. Accordingly, in the above example, the statement "mycar.car.doors=4;" would return a compile-time error as "doors" is an invalid element name based upon the imported car Schema. Similarly, in the above example, the statement "emycar.car.engine.cylinders='yes';" would return an error if the XML Schema file "car.xsd" specified that "cylinders" must contain an integer. In one embodiment, runtime validation may be deferred until explicitly requested using the validate( ) function built into the XML data types (e.g. "mycar.validate( )").

Various functional descriptions in the form of programming language extensions have been described above that facilitate flexible manipulation of XML objects in a native programming environment. The language extensions include a native XML data type and a collection of operations that enable programmers to navigate and manipulate XML objects in much the same way native language objects are navigated and manipulated. Thus in accordance with the teachings of the present invention, programmers are able to navigate and manipulate XML objects using familiar constructs of the native programming language, while availing themselves to the flexibility and extensibility afforded by XML. More specifically, in accordance with one embodiment of the invention, by integrating a native XML type into a given programming language such as Java, XML-based member functions for performing common operations within a native programming and/or scripting language can be made available. For example, the table of FIG. 3F illustrates various built-in XML member functions that can be made available to native programming languages through the use of the language extensions of the present invention.

Example Applications

As alluded to above, the language extensions of the present invention are particularly well-suited for use in mapping objects from a data representation language to corresponding objects of a programming language, and vice versa. Such a language mapping may be desirable in situations where, for example, a system having an internal operating environment based upon a programming language such as Java, is required to exchange data with other systems using a data representation language such as XML.

Figure 4:
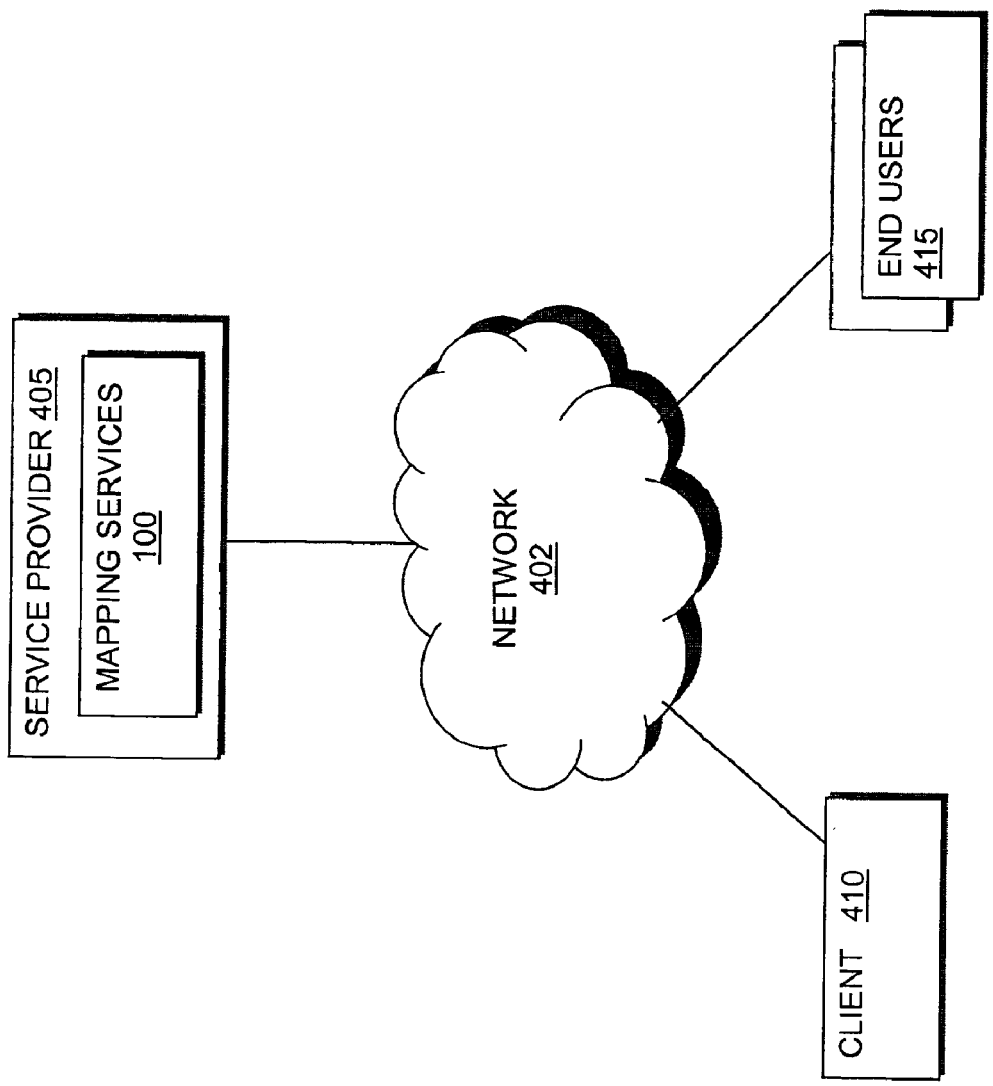
FIG. 4 is a block diagram illustrating one embodiment of a communication network suitable for use in practicing the present invention.

FIG. 4 is a block diagram illustrating an exemplary communication network incorporating the teachings of the present invention. As shown, service provider 405, client 110, and end users 415 are communicatively coupled together by network 402. Network 402 represents any of a number of communication networks such as one or more local area networks, wide area networks, the Internet, and so forth. Service provider 405 represents a "value added" service provider that provides content and/or services to client 410 and end users 415. Client 410 represents one or more entities that utilize the value added services of service provider 405 in order e.g., to provide improved content to end users 415 over network 402.

Scenario 1

Assume, for example, that service provider 405 has developed a new web service for generating interactive geographic maps that highlight various points of interest on behalf of client 410. To take advantage of this service offered by service provider 405, client 410 transmits a list of points of interest to service provider 405 via network 402. In response, service provider 405 generates one or more interactive geographic maps, which display selectable representations of the points of interest provided by client 410. Service provider 405 then returns one or more URL(s) pointing to the geographic map(s) to client 410, which in turn utilizes the URL(s) to display the geographic map(s) to end users 415. Each time a geographic map is presented to end users 415 by client 410, end users 415 may select one or more of the points, which are then returned to service provider 405. Service provider 405 then transmits the selected points back to the client 410 for any further processing client 410 wishes to perform.

The nature of the processing client 410 may perform is determined by client 410 and depends e.g. upon the context in which the service provider's services are utilized. For example, client 410 may represent a real estate agency that uses the points to display demographic data and property locations to end users 415, a weather service that uses the points to graphically display temperatures and weather phenomenon the weather service has gathered, a product manufacturer that uses the points to graphically display store locations, and so forth.

Each such incarnation of client 410 may utilize their own pre-defined XML format for transmitting such points of interest. For example, the weather community may have agreed on a format for transmitting information about weather phenomenon, the real estate community may have agreed on a format for transmitting information about homes, and product manufactures may have agreed on a format for transmitting store locations. Example 1 shows an XML format used e.g. by the product manufacturing community for transmitting the locations of stores that carry their products:

EXAMPLE 1

```
<available-at>
    <store>
        <name>The Electronics Store</name>
        <address>
            <street>23 Transistor Dr.</street>
            <city>Circuit</city>
            <state>WA</state>
            <zip>12345</zip>
        </address>
    </store>
    <store> ... </store>
    <store> ... </store>
</available-at>
```

Internally, however, service provider 405 represents points of interest as an array of points, each defined by the Java class shown below in Example 2:

EXAMPLE 2

```
public class Point {
    String label;           // text to display next to point
    LatitudeLongitude location;// location of point on map
}
```

In order to make it easy for a broad range of client communities to access their service, service provider 405 would like to be able to accept data in a wide variety of XML formats (i.e. such as the one shown in Example 1), and then have that data automatically mapped into analogous data structures within the native programming language of service provider 405.

FIGS. 5A–5B illustrate example functions, incorporating language extensions of the present invention for mapping XML documents to ECMAScript objects and ECMAScript objects to XML documents, as described above with respect to FIG. 4 in accordance with one embodiment of the invention. In the illustrated example, service provider 405 calls the "FromXML" function (as shown in FIG. 5A) each time it receives an XML document from client 410 that needs to be converted into ECMAScript objects. Similarly, each time service provider 405 needs to translate internal ECMAScript objects into XML for use by client 410, service provider 405 calls the "ToXML" function of FIG. 5B.

Reference is now drawn to FIG. 5A within which the "FromXML" function is illustrated. Assume, for example, a new client is in the process of transmitting location data to service provider 405 in the form of an XML document containing the structure shown in Example 1. Upon receiving the data, service provider 405 initiates a function call to "FromXML". Among items to note within the function, statement 500 uses the "double dot" operator (described above), in addition to the ".length" instruction to navigate through the received XML structure and allocate one new point object for each XML address provided. Next, for each address provided in the XML data, a display label and point location are determined based upon the internal data constraints of service provider 405 (as shown in Example 2). In statement 505, the "availableat..address" returns a list of address elements, which in turn are iteratively assigned to the variable "a". Next, the name of each store is determined using the parent( ) function built into the XML data type followed by the dot operator. In addition, the street address, city, state, and zip within which that store is located, is determined using the dot operator. As is illustrated by statements 510, strings returned by the direct access of descendent address elements are concatenated together to form the point label. Additionally, address information, including street, city, state, and zip information, is used in a LatitudeLongitude function (not shown) that computes a map location given an input address.

In FIG. 5B, a "ToXML" function is illustrated for use in converting ECMAScript based point locations into the XML elements shown in Example 1. To begin, the root node "<available-at >" is constructed by statement 525 using an XML literal. Next, statements 530 use ECMAScript's "String.split( )" function to parse the display label to determine a store name, street address, city, state and zip for each point. Finally, statements 535 create a store element for each point using XML literals with embedded ECMAScript expressions. Each store element is appended to the root node from statement 525 using the built-in appendChild( ) function.

FIGS. 7A–C illustrate example functions for mapping XML documents to Java objects and Java objects to XML documents, based upon techniques known in the prior art. As it can be readily seen, the amount and complexity of code required to implement the functions described above using Java and the standard XML Document Object Model (DOM) in accordance with the prior art is substantial compared to that required in FIGS. 5A and 5B. In addition, the XML DOM operators vary greatly from the familiar Java operators for navigating native data structures.

Scenario 2

In Example 1, an XML format was described that was used by a product manufacturing community for transmitting the locations of stores that carry their products. In Example 3 below, the XML format of Example 1 has been extended to indicate whether or not each store stocks the particular manufacturer's products.

EXAMPLE 3

```
<available-at>
    <store>
        <name>The Electronics Store</name>
        <stock-item>yes</stock-item>
        <address>
            <street>23 Transistor Dr.</street>
            <city>Circuit</city>
            <state>WA</state>
            <zip>12345</zip>
        </address>
    </store>
    <store> . . . </store>
    <store> . . . </store>
</available-at>
```

FIGS. 8A–8B include versions of ECMAScript functions, which have been modified in accordance with the teachings of the present invention to cause the generation of point objects only for those stores that are indicated as stocking products. Additionally in FIG. 8, an XML Schema (e.g. as illustrated in Example 3) developed e.g. by the product manufacturing community is utilized in accordance with the teachings of the present invention, to facilitate verification of whether the XML processing code is valid, and whether the XML being produced conforms to the manufacturing community's specification. At compile time, the compiler utilizes this Schema specification to detect errors in the code that would otherwise not appear until run-time, thereby reducing the number of errors in the production system. At run-time, the code uses the validate( ) function to detect errors in the dynamically constructed XML. If the validate function detects an error, an error condition (i.e., an exception) is generated, rather than returning invalid data.

Reference is now drawn to FIG. 8A, which illustrates the revised "FromXML" function. Statement 810 imports a new XML data type called "AvailableAt" described by the XML Schema file "AvailableAt.xsd". Statement 820 declares that the first parameter passed to the "FromXML" function is of type "AvailableAt". If it is not of type "AvailableAt", interpreter/compiler 104 generates an error. In addition, interpreter/compiler 104 verifies that each operation performed on the first parameter to function "FromXML" is allowed by the constraints specified in AvailableAt.xsd. In Statement 830, the expression "availableat..store" generates a list of elements containing all descendent elements of the variable "availableat" named "store". The expression '(stock-item=="yes")' uses a filtering predicate to select from that list, only the elements containing a child element named "stock-item" with the value "yes". Then the expression "address" iterates over the resulting list of elements, selecting child elements named "address". The "for" statement iterates over the resulting list of "address" elements, assigning each one to the variable "a", which is used to construct a point object. Interpreter/compiler 104 verifies that each of these operations is allowable and consistent with the AvailableAt XML data type defined in the file "AvailableAt.xsd". FIG. 8B illustrates the revised "ToXML" function. Statement 840 declares the first parameter passed to the "ToXML" function is of type "AvailableAt". If it is not of type "AvailableAt", interpreter/compiler 104 generates an error. In addition, interpreter/compiler 104 verifies that each operation performed on the first parameter to function "ToXML" is allowed by the constraints specified in AvailableAt.xsd. Statement 850 uses the "validate" function to explicitly verify the value of "availableat" conforms to the data type specified in "AvailableAt.xsd" at run-time and generates a list of errors if it does not. The "validate" function is useful when values are constructed dynamically using information not available to the compiler, such as user input or data read from external sources. In one embodiment, interpreter/compiler 104 may insert implicit calls to validate( ) into the generated code.

Scenario 3

FIG. 9 illustrates the use of functions written in alternate languages to generate a map that shows consumers where they can purchase a manufacturer's products in the United States. Instead of generating one point for each store, a point is generated for each state. Each such point is also labeled with the number of stores in the respective state that stock the manufacturer's products. The modified code of FIG. 9 uses a helper function called getStates( ), which is written in the XQuery language to identify the states having stores that stock the products, count the stores within each state, and generate an XML result having the following form:

EXAMPLE 4

```
<states>
    <state>
        <abbreviation>WA</abbreviation>
        <stores>10</stores>
    <state>
    <state>
        <abbreviation>CA</abbreviation>
        <stores>30</stores>
    </state>
    <state> . . . </state>
    <state> . . . </state>
</states>
```

Referring now to FIG. 9, statement 910 uses the "language" token to define a function written in the XQuery language called "getstates" that accepts a single parameter of XML data type "AvailableAt". Statements 920 show the body of the function, which generates a list of states containing stores that carry the product in the format show above. Statement 930 invokes the function "getStates" and stores the result in the XML variable "states". Statements 940 iterate over the resulting list of states, generating a point object for each one.

Example Host Computer System

Figure 6:
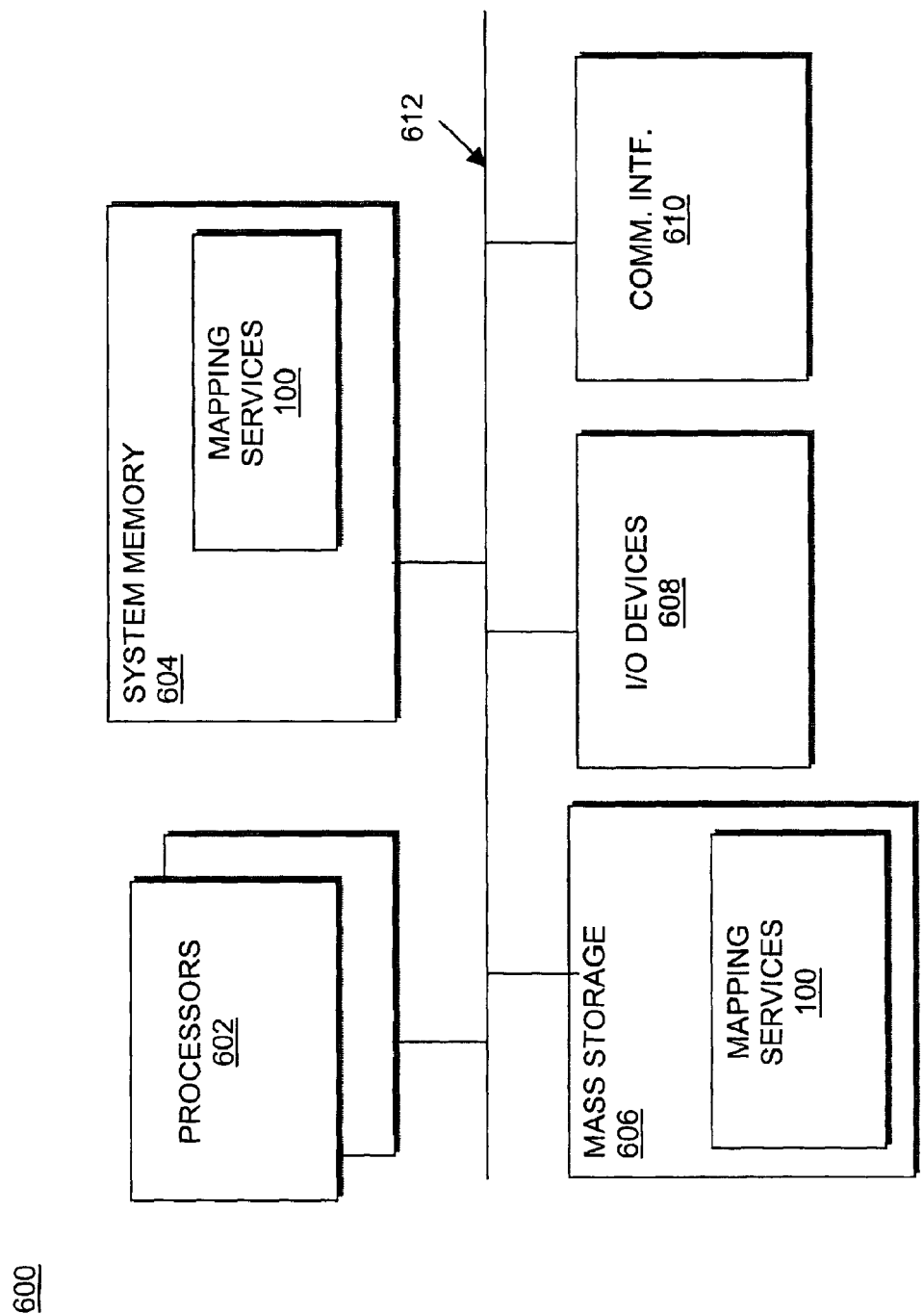
FIG. 6 illustrates an example computer system suitable for hosting the mapping services of the present invention including interpreter/compiler 104, in accordance with one embodiment.

FIG. 6 illustrates an example computer system suitable for hosting mapping services 100 and interpreter/compiler 104 of the present invention. As shown, computer system 600 includes one or more processors 602, and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the interpreter/compiler and/or mapping services of the present invention. The permanent copy of the programming instructions may be loaded into mass storage 606 in the factory, or in the field, through e.g. a distribution medium (not shown) or through communication interface 610 (from a distribution server (not shown). The constitution of these elements 602–612 are known, and accordingly will not be further described.

Conclusion and Epilogue

Thus, it can be seen from the above descriptions, novel data representation language extensions to a programming language have been described. The novel scheme is particularly useful for mapping data objects between a programming language and a data representation language. While the present invention has been described referencing the illustrated and above enumerated embodiments, the present invention is not limited to these described embodiments. Numerous modification and alterations may be made, consistent with the scope of the present invention as set forth in the claims to follow. Thus, the above-described embodiments are merely illustrative, and not restrictive on the present invention.

What is claimed is:

1. A method comprising:
    receiving one or more definitional statements expressed with language elements of a programming language;
    determining if said one or more definitional statements include an operator with a first operand representing a data representation language value and a second operand representing a conditional expression; and
    processing said operator to iteratively identify one or more elements selected from said data representation language value for which a test condition stipulated by said conditional expression is satisfied.

2. The method of claim 1, wherein said operator is a filtering predicate operator indicated by a period (".") followed by a set of parentheses "( )", wherein the parentheses contain at least said conditional expression.

3. The method of claim 1, wherein said data representation language comprises XML and said programming language comprises ECMAScript.

4. The method of claim 1, wherein said one or more definitional statements include a mapping definition to map selected elements of said data representation language to selected objects of said programming language or to map selected objects of said programming language to selected elements of said data representation language.

5. An article of manufacture comprising:
    a storage medium having stored therein a plurality of programming instructions designed to program an apparatus, which when executed enable the apparatus to
    receive one or more definitional statements expressed with language elements of a programming language;
    determine if said one or more definitional statements include an operator with a first operand representing a data representation language value and a second operand representing a conditional expression; and
    process said operator to iteratively identify one or more elements selected from said data representation language value for which a test condition stipulated by said conditional expression is satisfied.

6. The article of manufacture of claim 5, wherein said operator is a filtering predicate operator indicated by a period (".") followed by a set of parentheses "( )", wherein the parentheses contain at least said conditional expression.

7. The article of manufacture of claim 5, wherein said data representation language comprises XML and said programming language comprises ECMAScript.

8. The article of manufacture of claim 5, wherein said one or more definitional statements include a mapping definition to map selected elements of said data representation language to selected objects of said programming language or to map selected objects of said programming language to selected elements of said data representation language.

9. A method comprising:
    receiving one or more definitional statements expressed with language elements of a programming language;
    determining whether the one or more definitional statements comprises an expression representing a data representation language value and including one or more named child elements embedded within an unnamed parent element; and
    processing the expression including the unnamed parent element as an XML document fragment, if it is determined that the one or more definitional statements comprises an expression including one or more named child elements embedded within an unnamed parent element.

10. The method of claim 9, wherein operations between the unnamed parent element and the one or more named child elements affect only the child elements and not the parent element.

11. The method of claim 9, wherein said data representation language comprises XML and said programming language comprises ECMAScript.

12. The method of claim 9, wherein said one or more definitional statements include a mapping definition to map selected elements of said data representation language to selected objects of said programming language or to map selected objects of said programming language to selected elements of said data representation language.

13. An article of manufacture comprising:
    a storage medium having stored therein a plurality of programming instructions designed to program an apparatus, which when executed enable the apparatus to:
    receive one or more definitional statements expressed with language elements of a programming language;
    determine whether the one or more definitional statements comprises an expression representing a data representation language value and including one or more named child elements embedded within an unnamed parent element; and
    process the expression including the unnamed parent element as an XML document fragment if it is determined that the one or more definitional statements comprises an expression including one or more named child elements embedded within an unnamed parent element.

14. The article of manufacture of claim 13, wherein operations between the unnamed parent element and the one or more named child elements affect only the child elements and not the parent element.

15. The article of manufacture of claim 13, wherein said data representation language comprises XML and said programming language comprises ECMAScript.

16. The article of manufacture of claim 13, wherein said one or more definitional statements include a mapping definition to map selected elements of said data representation language to selected objects of said programming language or to map selected objects of said programming language to selected elements of said data representation language.

17. A method comprising:
    receiving one or more definitional statements expressed with language elements of a programming language;

determining whether the one or more definitional statements includes a statement designed to import a predefined data type description describing a class of objects associated with said data representation language;

determining whether the one or more definitional statements associate one or more data representation language values with said data type description;

determining whether the one or more definitional statements include an operator, wherein said one or more data representation language values are operands of said operator;

determining whether said operator will result in one or more of said data representation language values that do not conform with constraints specified by said data type description; and generating one or more error messages identifying said operator as generating results that do not conform with constraints specified by said data type.

18. The method of claim 17, wherein said data representation language comprises XML and said programming language comprises ECMAScript.

19. The method of claim 18, wherein said predefined data type description comprises one of an XML Schema and a data type description (DTD).

20. The method of claim 17, further comprising:
validating whether the one or more definitional statements are structured in conformance with one or more constraints associated with said predefined data type description.

21. The method of claim 17, wherein said one or more definitional statements include a mapping definition to map selected elements of said data representation language to selected objects of said programming language or to map selected objects of said programming language to selected elements of said data representation language.

22. An article of manufacture comprising:
a storage medium having stored therein a plurality of programming instructions designed to program an apparatus, which when executed enable the apparatus to:
receive one or more definitional statements expressed with language elements of a programming language;
determine whether the one or more definitional statements includes a statement designed to import a predefined data type description describing a class of objects associated with said data representation language;
determine whether the one or more definitional statements associate one or more data representation language values with said data type description;
determine whether the one or more definitional statements include an operator, wherein said one or more data representation language values are operands of said operator;
determine whether said operator will result in one or more of said data representation language values that do not conform with constraints specified by said data type description; and
generate one or more error messages identifying said operator as generating results that do not conform with constraints specified by said data type.

23. The article of manufacture of claim 22, wherein said data representation language comprises XML and said programming language comprises ECMAScript.

24. The article of manufacture of claim 23, wherein said predefined data type description comprises one of an XML Schema and a data type description (DTD).

25. The article of manufacture of claim 22, wherein said plurality of programming instructions further comprise instructions to:
validate whether the one or more definitional statements are structured in conformance with one or more constraints associated with said predefined data structure.

26. The article of manufacture of claim 22, wherein said one or more definitional statements include a mapping definition to map selected elements of said data representation language to selected objects of said programming language or to map selected objects of said programming language to selected elements of said data representation language.

27. A method comprising:
receiving one or more definitional statements expressed with language elements of a programming language;
determining if said one or more definitional statements include an expression representing a data representation language value;
determining whether the one or more definitional statements comprises an expression including an operator having a left operand and a right operand, wherein said left operand comprises one of an IDREF and IDREFS attribute; and
processing the expression to identify zero or more elements containing an id attribute whose value is equivalent to that of said IDREF or IDREFs attributes.

28. The method of claim 27, wherein said data representation language comprises XML and said programming language comprises ECMAScript.

29. The method of claim 28, wherein at least one of said IDREF and IDREFs attributes are indicated by a declaration in at least one of an XML Schema and a Document Type Declaration.

30. The method of claim 27, wherein said one or more definitional statements include a mapping definition to map selected elements of said data representation language to selected objects of said programming language or to map selected objects of said programming language to selected elements of said data representation language.

31. An article of manufacture comprising:
a storage medium having stored therein a plurality of programming instructions designed to program an apparatus, which when executed enable the apparatus to:
receive one or more definitional statements expressed with language elements of a programming language;
determine if said one or more definitional statements include an expression representing a data representation language value;
determine whether the one or more definitional statements comprises an expression including a first operator having a left operand and a right operand, wherein said left operand comprises one of an IDREF and IDREFS attribute; and
process the expression to identify one or more elements containing an id attribute whose value is equivalent to that of said IDREF or IDREFS attributes.

32. The article of manufacture of claim 31, wherein said data representation language comprises XML and said programming language comprises ECMAScript.

33. The article of manufacture of claim 32, wherein at least one of said IDREF and IDREFs attributes are indicated by a declaration in at least one of an XML Schema and a Document Type Declaration.

34. The article of manufacture of claim 31, wherein said one or more definitional statements include a mapping definition to map selected elements of said data representation language to selected objects of said programming language or to map selected objects of said programming language to selected elements of said data representation language.

35. A method comprising:
receiving one or more definitional statements expressed with language elements of a first programming language;
determining whether the one or more definitional statements include a statement designed to indicate the logic of a function is expressed using a second programming language from within said first programming language; and
processing the one or more definitional statements to pass at least a name and body of said function to be evaluated in association with said second programming language.

36. The method of claim 35, wherein determining whether the one or more definitional statements includes a statement designed to indicate the logic of a function is expressed using a second programming language comprises:
determining whether the one or more definitional statements includes a language token associated with said second programming language; and
accessing an external parser and expression evaluator associated with said second programming language if the one or more definitional statements includes said language token.

37. The method of claim 35, wherein said one or more definitional statements include a mapping definition to map selected elements of said data representation language to selected objects of said programming language or to map selected objects of said programming language to selected elements of said data representation language.

38. An article of manufacture comprising:
a storage medium having stored therein a plurality of programming instructions designed to program an apparatus, which when executed enable the apparatus to:
receive one or more definitional statements expressed with language elements of a first programming language;
determine whether the one or more definitional statements include a statement designed to indicate the logic of a function is expressed using a second programming language from within said first programming language; and
process the one or more definitional statements to pass at least the a name and body of said function to be evaluated in association with said second programming language.

39. The article of manufacture of claim 38, wherein determining whether the one or more definitional statements includes a statement designed to indicate the logic of a function is expressed using a second programming language comprises:
determining whether the one or more definitional statements includes a language token associated with said second programming language; and
accessing an external parser and expression evaluator associated with said second programming language if the one or more definitional statements includes said language token.

40. The article of manufacture of claim 38, wherein said one or more definitional statements include a mapping definition to map selected elements of said data representation language to selected objects of said programming language or to map selected objects of said programming language to selected elements of said data representation language.

41. A method comprising:
receiving a mapping definition mapping between selected elements of an XML data structure and one or more ECMAScript objects;
determining whether the mapping definition comprises one or more definitional statements expressed with language elements of said one or more ECMAScript objects;
determining whether the one or more definitional statements includes an operator with a first operand representing a data representation language value and a second operand representing a conditional expression, if the mapping definition does comprise one or more definitional statements expressed with language elements of said one or more ECMAScript objects; and
processing said operator to iteratively identify one or more elements selected from said data representation language value for which a test condition stipulated by the conditional expression is satisfied.

42. A method comprising:
receiving a mapping definition mapping between selected elements of an XML data structure and one or more ECMAScript objects;
determining whether the mapping definition comprises one or more definitional statements expressed with language elements of said one or more ECMAScript objects;
determining whether the one or more definitional statements comprises an expression including one or more elements embedded within an unnamed parent element, if the mapping definition comprises one or more definitional statements expressed with language elements of said one or more ECMAScript objects; and
processing the expression including the unnamed parent element as an XML document fragment if it is determined that the one or more definitional statements comprises an expression including one or more elements embedded within an unnamed parent element.

43. A method comprising:
receiving a mapping definition mapping between selected elements of an XML data structure and one or more ECMAScript objects;
determining whether the mapping definition comprises one or more definitional statements expressed with data representation oriented language elements of said one or more ECMAScript objects;
determining whether the one or more definitional statements includes a statement designed to import a predefined data type description describing a class of objects associated with said data representation language, if the mapping definition does in fact comprise one or more definitional statements expressed with language elements of said one or more ECMAScript objects;
determining whether the one or more definitional statements associate one or more data representation language values with said data type description;
determining whether the one or more definitional statements include an operator, wherein said one or more data representation language values are operands of said operator;
determining whether said operator will result in one or more of said data representation language values that do not conform with constraints specified by said data type description; and generating one or more error messages identifying said operator as generating results that do not conform with constraints specified by said data type.

44. A method comprising:

receiving a mapping definition mapping between selected elements of an XML data structure and selected objects of one or more ECMAScript objects;

determining whether the mapping definition comprises one or more definitional statements expressed with language elements of said one or more ECMAScript objects;

determining whether the one or more definitional statements comprises an expression including a operator having a left operand and a right operand, wherein said left operand comprises one of an IDREF and IDREFS attribute, if the mapping definition does comprise one or more definitional statements expressed with language elements of said one or more ECMAScript objects; and processing the expression to identify zero or more of said elements containing an id attribute whose value is equivalent to that of said IDREF and IDREFS attributes.

45. A method comprising:

receiving a mapping definition mapping between selected elements of an XML data structure and one or more ECMAScript objects;

determining whether the mapping definition comprises one or more definitional statements expressed with data representation oriented language elements of said one or more ECMAScript objects;

determining whether the one or more definitional statements includes a statement designed to indicate the logic of a function is expressed using a programming language from within said one or more ECMAScript objects, if the mapping definition does in fact comprise one or more definitional statements expressed with language elements of said one or more ECMAScript objects; and processing the one or more definitional statements to pass at least a name and body of said function to be evaluated in association with said one or more ECMAScript objects.

* * * * *

UNITED STATES PATENT AND TRADEMARK OFFICE
CERTIFICATE OF CORRECTION

PATENT NO. : 6,918,107 B2  
APPLICATION NO. : 10/082800  
DATED : July 12, 2005  
INVENTOR(S) : Bosworth et al.

It is certified that error appears in the above-identified patent and that said Letters Patent is hereby corrected as shown below:

Column 10  
Line 14, "...emycar.car.engine.cylinders..." should read --...mycar.car.engine.cylinders...--.

Column 19  
Line 51, "...the a name.." should read --...a name...--.

Signed and Sealed this

Twenty-seventh Day of March, 2007

JON W. DUDAS  
*Director of the United States Patent and Trademark Office*